United States Patent [19]

Sullivan et al.

[11] 4,058,327

[45] Nov. 15, 1977

[54] DISPLAY DEVICE

[75] Inventors: Peter Sullivan, Grand Valley, Canada; John P. Yackel, Circle Pines, Minn.

[73] Assignee: American Guidance Service, Inc., Circle Pines, Minn.

[21] Appl. No.: 737,349

[22] Filed: Nov. 1, 1976

[51] Int. Cl.$^2$ .............................................. B42D 3/16
[52] U.S. Cl. ........................................ 281/33; 283/31
[58] Field of Search ............... 281/33, 31; 402/74; 40/104.18; 35/7 R, 54

[56] References Cited

U.S. PATENT DOCUMENTS

| | | | |
|---|---|---|---|
| 2,091,260 | 8/1937 | Farkas et al. | 40/104.18 |
| 2,318,192 | 5/1943 | Boelema, Jr. | 281/31 |
| 2,865,659 | 12/1958 | Zimmermann | 281/31 |
| 3,503,141 | 3/1970 | Schwartz | 281/31 X |
| 3,620,552 | 11/1971 | Woodcock | 281/33 |

FOREIGN PATENT DOCUMENTS 1,436,140   10/1968   Germany ........................... 402/74

*Primary Examiner*—William H. Grieb
*Attorney, Agent, or Firm*—Burd, Braddock & Bartz

[57] ABSTRACT

A presentation folder for the display of test or other educational material or sales or promotion material, or the like. The device is a compact unit for storing and displaying pictorial and/or typographical material printed or otherwise reproduced on pages within the device. When closed, it is in the form of a book. When opened, it assumes the form of an easel presenting stimulus material. The unit includes a one-piece molded casing having relatively stiff front and back covers formed integral with and hinged to a spine, and includes a plurality of pages of pictorial and/or typographical stimulus material loosely bound, as by spiral or other binding, or the like, for flipping from one side to the other of the easel formed when the device is opened. The device is provided with an integral storage compartment for receiving manuals, recorded tape reels and/or casettes, or the like.

9 Claims, 9 Drawing Figures

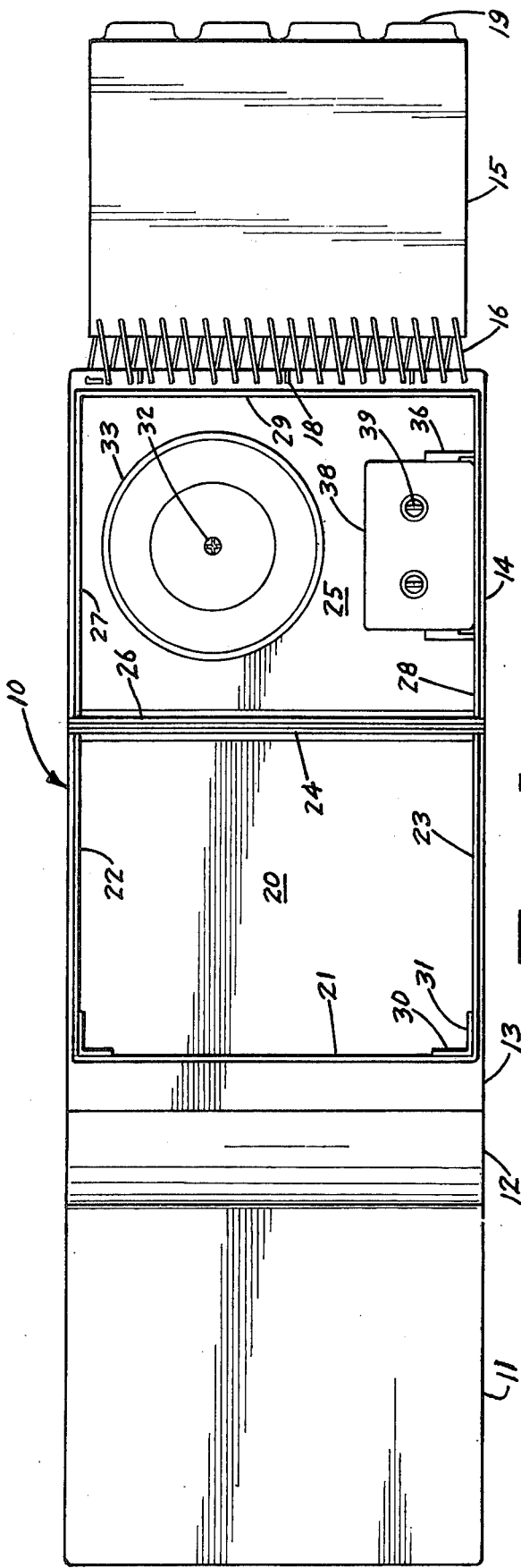
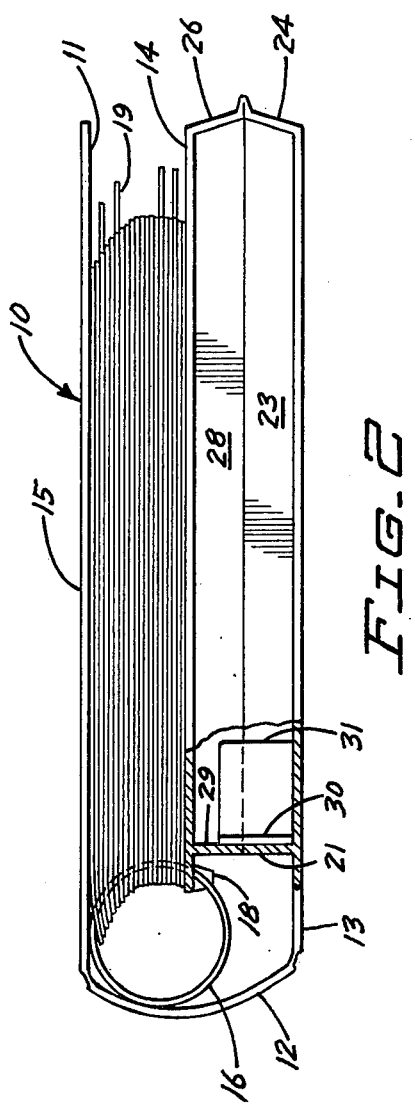

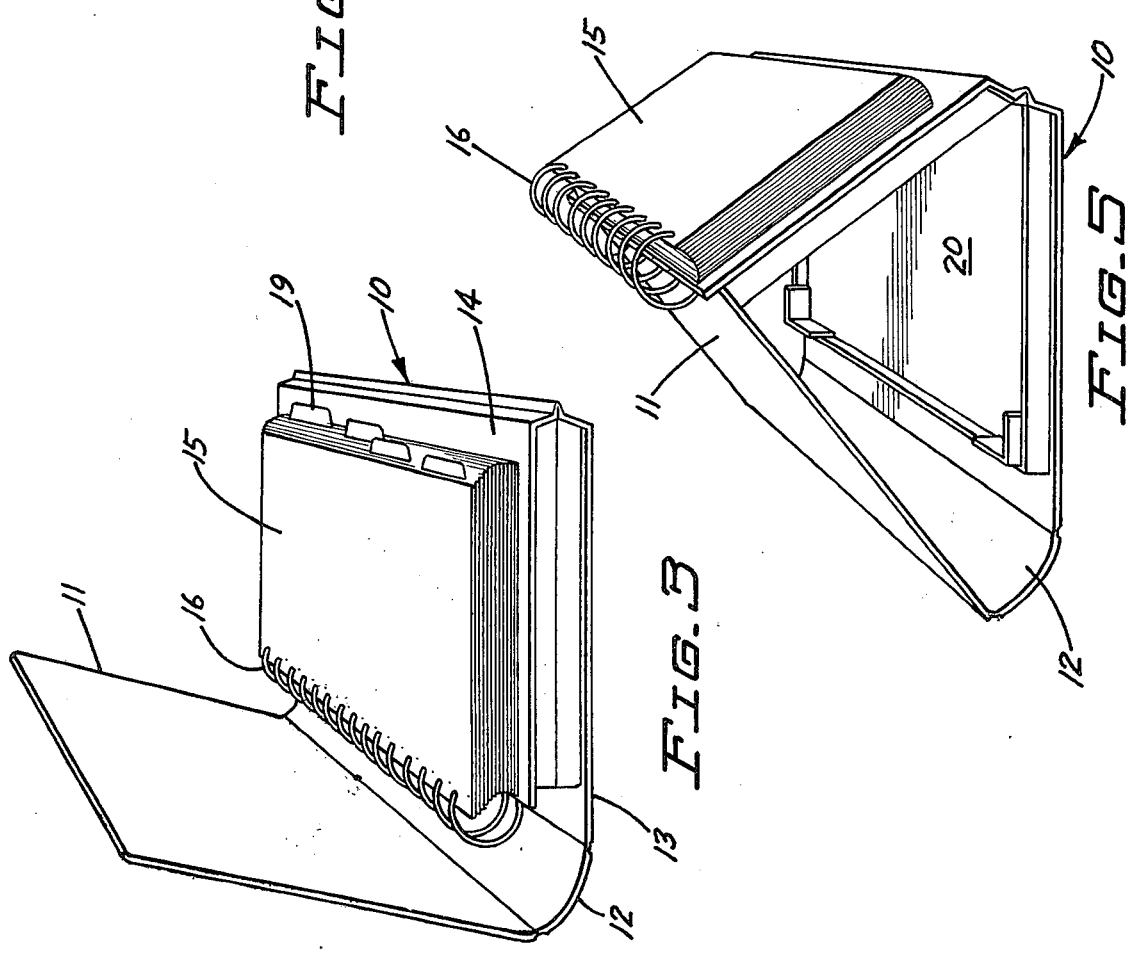

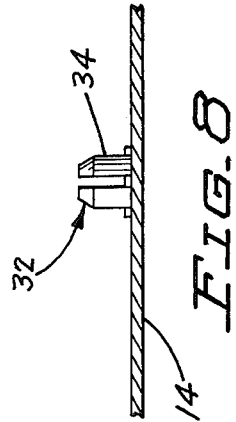
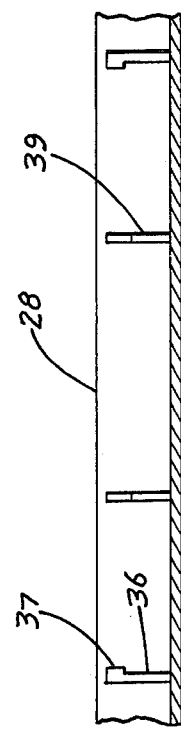
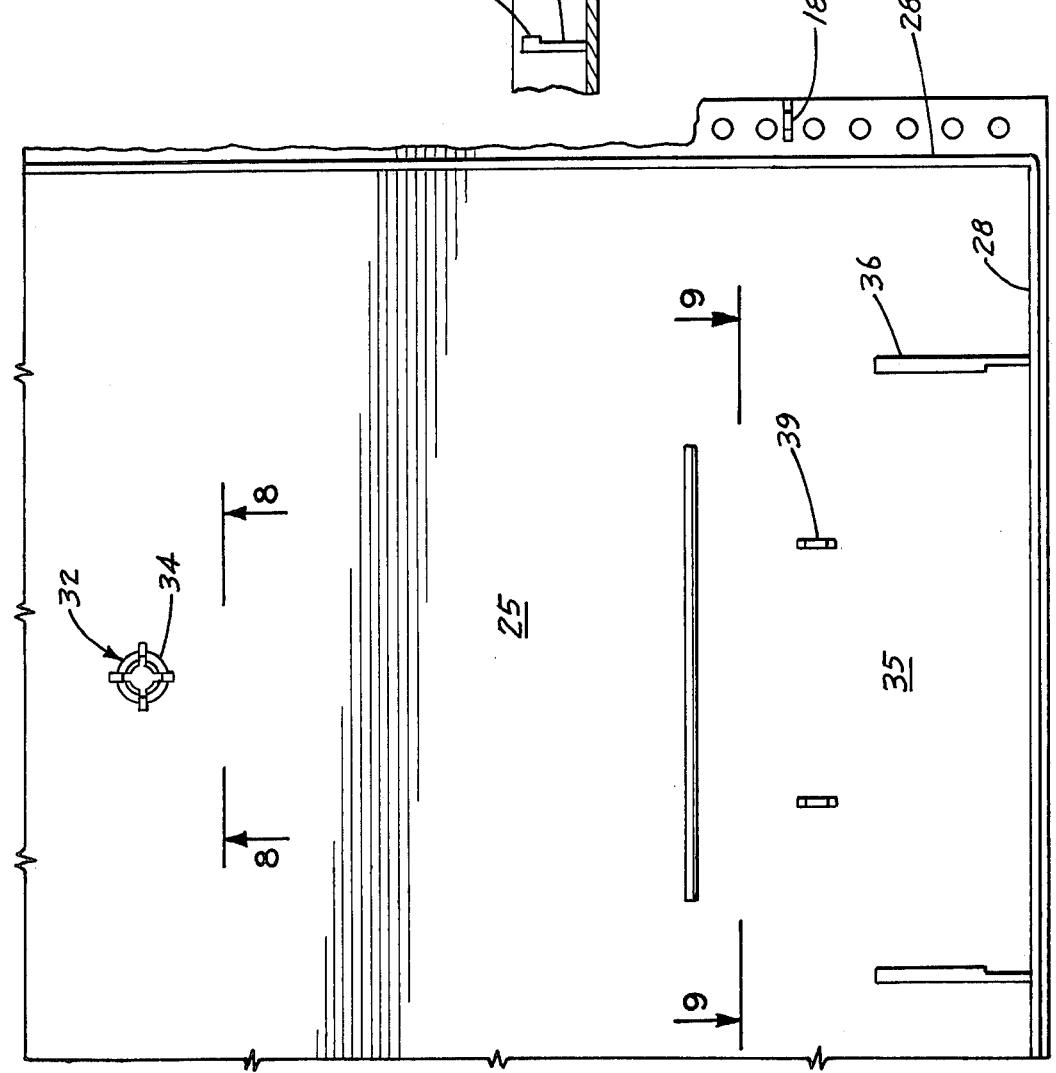

DISPLAY DEVICE

This invention relates to a compact presentation folder for the display of test or other educational material or sales or promotion material, or the like. When closed, it resembles a book or notebook. When opened, it assumes the form of an easel on which is displayed pictorial or typographical stimulus material loosely bound so that material on consecutive pages can be serially displayed by flipping the pages from the front to the back sides of the easel. Although intended primarily for educational use, for testing and similar purposes, it is useful for various sale and promotional purposes, for presentation of insurance and investment data, and the like.

The present invention represents an improvement over the similar display device disclosed and claimed in prior U.S. Pat. No. 3,620,552, issued Nov. 16, 1971 to Richard W. Woodcock and John P. Yackel, one of the present inventors, and having common ownership with this application. The display device according to the present invention is characterized by having a one-piece molded synthetic resinous casing having a relatively stiff front cover formed integral with and hinged to one side of a spine and a compound back cover formed integral with and hinged to the opposite side of the spine. The back cover is formed from two relatively stiff panels integral with and hinged to each other, and each having complementary projecting wall portions defining shallow compartments which together define a deeper storage compartment in the closed device. One of the shallow compartments desirably is provided with one or more resilient hubs for mounting tape reels and/or resilient holders for receiving tape cassettes. Integral frictional closure means are provided to hold the storage compartment in closed position and integral latching means are provided to hold the device in assembled easel form.

The invention is illustrated in the accompanying drawings in which:

FIG. 1 is a top plan view of the display device shown laid out flat and fully open;

FIG. 2 is an end elevation of an enlarged scale showing the device fully closed and partly broken away to show the storage compartment closure means;

FIG. 3 is a perspective view showing the device partially open;

FIG. 4 shows the device in an intermediate position preparatory to forming an easel structure;

FIG. 5 is a perspective view of the device assembled in easel form for display of the stimulus material;

FIG. 6 is a fragmentary plan view showing in greater detail the form of latch for maintaining the easel stable and showing tape mounting means;

FIG. 7 is an end elevation of the latch structure of FIG. 6 shown in engagement with the front cover of the device;

FIG. 8 is an enlarged fragmentary elevation on the line 8—8 of FIG. 6 and in the direction of the arrows; and FIG. 9 is an enlarged fragmentary elevation on the line 9—9 of FIG. 6 and in the direction of the arrows.

Referring now to the drawings, and particularly to FIGS. 1 through 5, the display device according to the one-piece molded construction of the present invention comprises a book-like unit, indicated generally at 10. The unit includes generally a flat rectangular semi-rigid panel 11 corresponding to the front cover of a book, a similar stiff panel 12, arcuate in cross-section, of the same height but lesser width corresponding to the spine of a book, and a panel 13 corresponding to the back cover of a book. Panels 11 and 13 are formed integral with panel 12 and are hingedly connected to the narrower spine panel 12 as is common in books and notebooks.

A further auxiliary back cover panel 14 corresponding generally to panel 13 is formed integral with and is hingedly secured to panel 13 opposite from spine 12. Panel 14 is hinged so that it may be folded into face-to-face relation with the inside surface of panel 13, as seen in FIGS. 2 and 3, panels 13 and 14 and associated structure, as hereinafter described, then together forming a compound back cover. A stack of a plurality of pages 15 of material to be displayed is loosely bound to the free edge of panel 14 opposite from its hinged connection with panel 13, as by means of wire binding or ring binding 16, or the like. The pages 15 are desirably slightly smaller in their overall dimensions than panel 14 so as to permit the edges of the panels to provide a slightly overhanging and protective lip for the pages when the device is in folded book form, as in FIG. 2.

The adjacent edges of panel 14 and pages 15 are provided with a plurality of complementary perforations 17 to accommodate the loose wire or ring binding. A plurality of perpendicularly projecting latch elements 18 are integrally molded on the inside surface of panel 14 for the purpose of holding the device in assembled easel form, as explained in greater detail hereinafter.

The sheets 15 may be imprinted on one or both sides: For test purposes, the one side visible to the examinee will bear certain stimulus material and the opposite side of the next adjacent sheet which is simultaneously visible to the examiner bears related identifying or explanatory material. Where several sets of stimulus material may be included in a single device, suitable indexing means 19 may be provided. The spine panel 12 is of sufficient width to accommodate the combined thickness of the plurality of sheets 15 and panels 13 and 14 and associated structure.

The device is assembled to form an easel generally as follows: The closed unit, as in FIG. 2, is placed on a desk or table with the outside face of panel 13 in engagement with the surface. The front cover panel 11 is lifted, as in FIGS. 3 and 4, sufficient to permit panel 14 with its attached stack of pages 15 to be lifted free, as in FIG. 4. Then the front cover 11 is folded inwardly toward panel 14 and the edge lip of panel 11 is caused to engage latch elements 18 on the inside surface of panel 14. This is best seen in FIGS. 6 and 7. The edge lip of panel 11 engages both the latch elements and the wall of the storage compartment on panel 14 insuring stability of the easel structure such that accidental pressure against the top surface of panel 11 will not cause the easel to collapse.

In assembled position, as shown in FIG. 5, the unit is now ready for use. The easel is positioned with the surface of pages 15 facing the person or the group to which the material is to be displayed. Then, one by one, after the material on the front face of each page 15 has been displayed for the requisite time, that page is flipped over on the relatively loose binding 16 so as to lie against the angularly disposed front cover panel 11. The pages are turned in sequence until all of the desired display material has been exhibited.

Panel 13 is provided with a shallow rectangular storage compartment 20 on its inner face for receiving instruction books, manuals, or the like. Compartment 20 is defined by wall 21 projecting perpendicularly from the panel spaced inwardly from the integral hinged edge joining panel 13 and spine 12 sufficiently far to accommodate binding 16, as seen in FIG. 2, top and bottom perpendicular walls 22 and 23 preferably spaced slightly inwardly from the edge of the panel to provide a lip, and an angularly extending end wall 24.

Panel 14 is provided with a similar shallow rectangular storage compartment 25 on its inner face. In the illustrated embodiment, the compartment is adapted for receiving tape reels and/or cassettes, or the like. Compartment 25 is of generally the same dimensions as compartment 20 and is defined by angularly extending end wall 26, top and bottom perpendicular walls 27 and 28 and perpendicular end wall 29.

The integral flexible hinged edge joining panels 13 and 14 is at the top of angularly extending wall portions 24 and 26. Perpendicular end wall 29 cooperates with projecting latch elements 18 to engage the lip of front cover 11 to hold the display device in its open easel configuration.

The top edges of compartment walls 21–24 lie generally in a plane and the top edges of compartment walls 26–29 lie generally in a plane such that, when panel 14 is folded inwardly upon panel 13, top walls 22 and 27 abut, bottom walls 23 and 28 abut, and end walls 21 and 29 abut, as seen in FIG. 2. In order to maintain the panels 13 and 14 in closed face-to-face relation and maintain the resulting larger storage compartment closed, frictional closure means are provided. Auxiliary perpendicular wall portions 30 and 31 are provided at each of the corners between walls 21 and 22 and between walls 21 and 23. The auxiliary wall portions are disposed against the inside faces of the compartment walls integral therewith and project above the top edges thereof by a distance corresponding to the depth of compartment 25 or less. When panel 14 is folded inwardly upon panel 13, the outer faces of auxiliary wall portions 30 and 31 frictionally engage the inner wall surfaces of compartment 25 adjacent the corners thereof.

As illustrated, compartment 25 is desirably provided with an integral resilient hub or nipple 32 adapted to frictionally engage a tape reel 33. As best seen in FIGS. 6 and 8, hub 32 is formed from a plurality of perpendicularly projecting arcuate segments 34 integral with panel 14 and spaced apart to provide resiliency. The top of the hub is desirably tapered to facilitate mounting of a tape reel.

A receptacle 35 is also provided in compartment 25 for engaging a tape cassette. Receptacle 35 includes a pair of parallel spaced apart wall members 36 integral with and projecting perpendicularly from panel 14 and perpendicular to compartment bottom wall 28 to form a cassette receiving pocket. Walls 36 are relatively thin and capable of slight flexing. The inner edges of walls 36 are desirably provided with a longitudinal projecting rib 37 (as seen in FIG. 9) for frictionally engaging cassette 39. The receptacle is also provided with a pair of integral spaced apart perpendicularly extending projections 39 which engage the sprockets of the tape reels within the cassette and assist in engaging the cassette. Because reel 33 and cassette 38 are frictionally engaged and retained in compartment 25, panel 14 can be folded inwardly without fear of the tapes falling out.

The casing is formed in one piece from synthetic resinous material of requisite strength and flexibility by injection molding. Polypropylene is a preferred molding material, being well known for its capability of being folded and flexed over a long life span without developing fatigue.

After use, the unit is closed by flipping the plurality of pages 15 back against panel 14, lifting panel 14 to release the latch 18, lifting front cover panel 11 slightly to permit panel 14 to resume its face-to-face engagement with back cover panel 13 and then closing front cover panel 11. When used for testing purposes, the easel shields from the examinee the scoring sheet on which the examiner records responses. In this manner, distraction of the examinee by the recording of responses is effectively eliminated.

When in assembled form for use as a display easel, the device resembles a triangular prism whose ends are generally isosceles triangles. One cover is the base of the prism. The loose wire or ring binding is at the apex. The two angularly disposed sides are formed by the other cover and the stack of pages to be displayed.

It is apparent that many modifications and variations of this invention as hereinbefore set forth may be made without departing from the spirit and scope thereof.

The embodiments of the invention in which an exclusive property or privilege is claimed are defined as follows:

1. A compact book-like storage and display device comprising a one-piece molded synthetic resinous casing and a stack of a plurality of pages bearing the material to be displayed loosely bound to one free edge of said casing, said device further characterized by:
    A. a front cover and a back cover each integral with and hingedly connected to opposite sides of a relatively narrower spine, said covers being generally flat and semi-rigid and said spine being generally arcuate in transverse cross-section and rigid;
    B. one of said covers being a compound cover composed of two generally flat and semi-rigid panels each having an angularly extending end wall portion;
    C. the first of said panels being integral with and hingedly connected on one side to the spine and integral with and hingedly connected on the other side to the other panel along the edges of said angularly extending end wall portions;
    D. a perpendicularly extending wall portion along the top and bottom edges of both of said panels and spaced inwardly from the edges of the panels opposite the angularly extending end wall portions, said wall portions defining a shallow storage compartment on the inner face of each of said panels;
    E. said stack of pages bearing the material to be displayed being loosely bound to the free edge of said other panel opposite from its hinged connection to the first panel and outside of said storage compartment thereon, said loose binding lying generally along a line parallel to the spine, being loose enough to permit the pages to be folded against either side of said other panel, and comprising a plurality of perforations along one side edge of said stack of pages and the adjacent side edge of said other panel to which the pages are bound;
    F. at least one generally annular fastening element extending through contiguous perforations of said pages and panel;

G. positive latching means provided adjacent the edge of said other panel on the inner surface thereof adjacent to the perpendicular wall portion and adjacent to said loose binding, said latching means comprising a plurality of spaced apart perpendicular projecting tabs spaced from said perpendicular wall portion by about the thickness of said front cover, whereby the free edge of said front cover is engageable between said perpendicular wall portion and said tabs;

H. said device when closed forming a generally flat book-like storage unit; and

I. said device when folded into a generally triangular prism, having one of said covers as a base, said loose binding as one edge, the other of said covers as one side and the stack of pages as the other side, forming an easel display for the material on said pages.

2. A display device according to claim 1 further characterized in that frictional engaging closure means are provided for said storage compartments.

3. A display device according to claim 2 further characterized in that said closure means comprises an auxiliary perpendicular wall portion at each of the corners of one of said shallow compartments formed by the perpendicular wall portions thereof, said auxiliary wall portions being disposed against the inside faces of said compartment wall portions and integral therewith, and projecting above the top edges of said wall portions by a distance less than the depth of said other shallow compartment.

4. A display device according to claim 3 further characterized in that said auxiliary wall portions are provided on said shallow compartment on the first of said back cover panels.

5. A display device according to claim 1 further characterized in that integral tape engaging means are provided in one of said shallow compartments.

6. A display device according to claim 5 further characterized in that said tape engaging means comprises a resilient hub adapted to engage a tape reel, said hub including a plurality of spaced apart arcuate segments each integral with and projecting perpendicularly from the back panel forming the bottom of the compartment.

7. A display device according to claim 6 further characterized in that the top of said hub is tapered to facilitate reel mounting.

8. A display device according to claim 5 further characterized in that said tape engaging means comprises a cassette receptacle, said receptacle including:

A. a pair of spaced apart parallel wall members integral with and perpendicular to the back cover panel forming the bottom of the compartment and perpendicular to one of said perpendicular compartment walls, and B. a pair of spaced apart sprocket engaging projections integral with and perpendicular to said panel.

9. A display device according to claim 8 further characterized in that the inner facing top edges of said wall members are each provided with a longitudinal rib.

* * * * *

UNITED STATES PATENT AND TRADEMARK OFFICE
CERTIFICATE OF CORRECTION

PATENT NO. : 4,058,327
DATED : November 15, 1977
INVENTOR(S) : Peter Sullivan et al It is certified that error appears in the above-identified patent and that said Letters Patent are hereby corrected as shown below:

In the heading, --Ontario-- is omitted from Inventor Sullivan's address.

Column 3, line 62, "39" should be --38--.

Column 6, line 15, after "back", --cover-- is omitted.

Signed and Sealed this

Twenty-first Day of February 1978

[SEAL]

Attest:

RUTH C. MASON
Attesting Officer

LUTRELLE F. PARKER
Acting Commissioner of Patents and Trademarks